United States Patent
Nightingale et al.

(10) Patent No.: US 8,438,244 B2
(45) Date of Patent: May 7, 2013

(54) BANDWIDTH-PROPORTIONED DATACENTERS

(75) Inventors: Edmund B. Nightingale, Redmond, WA (US); Jeremy E. Elson, Seattle, WA (US); Jonathan R. Howell, Seattle, WA (US); Galen C. Hunt, Bellevue, WA (US); David A. Maltz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 184 days.

(21) Appl. No.: 12/766,726

(22) Filed: Apr. 23, 2010

(65) Prior Publication Data

US 2011/0258290 A1    Oct. 20, 2011

Related U.S. Application Data

(63) Continuation-in-part of application No. 12/763,107, filed on Apr. 19, 2010, and a continuation-in-part of application No. 12/763,133, filed on Apr. 19, 2010, now Pat. No. 8,181,061.

(51) Int. Cl.
*G06F 15/16* (2006.01)
(52) U.S. Cl.
USPC .......... 709/219; 709/231; 709/235; 704/261; 704/262
(58) Field of Classification Search .......... 709/219, 709/231, 235; 704/261, 262
See application file for complete search history.

(56) References Cited

U.S. PATENT DOCUMENTS

| | | | |
|---|---|---|---|
| 4,491,945 A | 1/1985 | Turner | |
| 4,780,870 A | 10/1988 | McHarg et al. | |
| 5,305,320 A | 4/1994 | Andrews et al. | |
| 5,423,046 A | 6/1995 | Nunnelley et al. | |
| 5,553,285 A * | 9/1996 | Krakauer et al. | 1/1 |
| 5,663,951 A | 9/1997 | Danneels et al. | |
| 5,914,878 A | 6/1999 | Yamamoto et al. | |
| 5,938,732 A | 8/1999 | Lim et al. | |
| 6,424,979 B1 | 7/2002 | Livingston et al. | |

(Continued)

FOREIGN PATENT DOCUMENTS

WO    WO2010108368 A1    9/2010

OTHER PUBLICATIONS

Akturk, "Asynchronous Replication of Metadata Across Multi-Master Servers in Distributed Data Storage Systems", A Thesis Submitted to Louisiana State University and Agricultural and Mechanical College, Dec. 2009, 70 pages.

(Continued)

*Primary Examiner* — Tesfay Yohannes
(74) *Attorney, Agent, or Firm* — Lee & Hayes, PLLC

(57) ABSTRACT

A system including at least one storage node and at least one computation node connected by a switch is described herein. Each storage node has one or more storage units and one or more network interface components, the collective bandwidths of the storage units and the network interface components being proportioned to one another to enable communication to and from other nodes at the collective bandwidth of the storage units. Each computation node has logic configured to make requests of storage nodes, an input/output bus, and one or more network interface components, the bandwidth of the bus and the collective bandwidths of the network interface components being proportioned to one another to enable communication to and from other nodes at the bandwidth of the input/output bus.

20 Claims, 8 Drawing Sheets

U.S. PATENT DOCUMENTS

| | | | |
|---|---|---|---|
| 6,577,613 | B1 | 6/2003 | Ramanathan |
| 6,850,489 | B1 | 2/2005 | Omi et al. |
| 6,871,295 | B2 | 3/2005 | Ulrich et al. |
| 7,076,555 | B1 | 7/2006 | Orman et al. |
| 7,115,919 | B2 | 10/2006 | Kodama |
| 7,180,875 | B1 | 2/2007 | Neumiller et al. |
| 7,184,958 | B2* | 2/2007 | Kagoshima et al. .......... 704/260 |
| 7,231,475 | B1 | 6/2007 | Singla et al. |
| 7,240,358 | B2 | 7/2007 | Horn et al. |
| 7,342,876 | B2 | 3/2008 | Bellur et al. |
| 7,383,288 | B2 | 6/2008 | Miloushev et al. |
| 7,433,332 | B2 | 10/2008 | Golden et al. |
| 7,437,407 | B2 | 10/2008 | Vahalia et al. |
| 7,577,817 | B2 | 8/2009 | Karpoff et al. |
| 7,610,348 | B2 | 10/2009 | Kisley et al. |
| 7,657,581 | B2 | 2/2010 | Orenstein et al. |
| 7,725,437 | B2 | 5/2010 | Kirshenbaum et al. |
| 7,756,826 | B2 | 7/2010 | Bots et al. |
| 7,769,843 | B2 | 8/2010 | Neuse et al. |
| 7,774,469 | B2 | 8/2010 | Massa et al. |
| 7,801,994 | B2 | 9/2010 | Kudo |
| 7,805,580 | B2 | 9/2010 | Hirzel et al. |
| 8,010,829 | B1 | 8/2011 | Chatterjee et al. |
| 8,074,107 | B2 | 12/2011 | Sivasubramanian et al. |
| 8,160,063 | B2 | 4/2012 | Maltz et al. |
| 8,181,061 | B2 | 5/2012 | Nightingale et al. |
| 8,234,518 | B2 | 7/2012 | Hansen |
| 8,261,033 | B1 | 9/2012 | Slik et al. |
| 2002/0152293 | A1 | 10/2002 | Hahn et al. |
| 2004/0153479 | A1 | 8/2004 | Mikesell et al. |
| 2005/0075911 | A1 | 4/2005 | Craven |
| 2005/0078655 | A1* | 4/2005 | Tiller et al. .................... 370/351 |
| 2005/0094640 | A1 | 5/2005 | Howe |
| 2005/0262097 | A1 | 11/2005 | Sim-Tang et al. |
| 2006/0004759 | A1 | 1/2006 | Borthakur et al. |
| 2006/0015495 | A1* | 1/2006 | Keating et al. ..................... 707/6 |
| 2006/0074946 | A1* | 4/2006 | Pham ............................ 707/100 |
| 2006/0098572 | A1 | 5/2006 | Zhang et al. |
| 2006/0129614 | A1 | 6/2006 | Kim et al. |
| 2006/0280168 | A1 | 12/2006 | Ozaki |
| 2007/0025381 | A1* | 2/2007 | Feng et al. .................... 370/431 |
| 2007/0156842 | A1 | 7/2007 | Vermeulen et al. |
| 2008/0005275 | A1 | 1/2008 | Overton et al. |
| 2008/0010400 | A1 | 1/2008 | Moon |
| 2008/0098392 | A1 | 4/2008 | Wipfel et al. |
| 2009/0006888 | A1 | 1/2009 | Bernhard et al. |
| 2009/0106269 | A1 | 4/2009 | Zuckerman et al. |
| 2009/0112921 | A1 | 4/2009 | Oliveira et al. |
| 2009/0113323 | A1 | 4/2009 | Zhao et al. |
| 2009/0183002 | A1* | 7/2009 | Rohrer et al. ................. 713/168 |
| 2009/0204405 | A1* | 8/2009 | Kato et al. .................... 704/268 |
| 2009/0259665 | A1 | 10/2009 | Howe et al. |
| 2009/0265218 | A1* | 10/2009 | Amini et al. ..................... 705/10 |
| 2009/0268611 | A1 | 10/2009 | Persson et al. |
| 2009/0300407 | A1 | 12/2009 | Kamath et al. |
| 2009/0307329 | A1 | 12/2009 | Olston et al. |
| 2010/0008230 | A1 | 1/2010 | Khandekar et al. |
| 2010/0008347 | A1 | 1/2010 | Qin et al. |
| 2010/0094955 | A1 | 4/2010 | Zuckerman et al. |
| 2010/0094956 | A1 | 4/2010 | Zuckerman et al. |
| 2010/0161657 | A1 | 6/2010 | Cha et al. |
| 2010/0198888 | A1 | 8/2010 | Blomstedt et al. |
| 2010/0198972 | A1 | 8/2010 | Umbehocker |
| 2010/0250746 | A1 | 9/2010 | Murase |
| 2010/0332818 | A1 | 12/2010 | Prahlad et al. |
| 2011/0022574 | A1 | 1/2011 | Hansen |
| 2011/0153835 | A1* | 6/2011 | Rimac et al. .................. 709/227 |
| 2011/0246471 | A1* | 10/2011 | Rakib ............................ 707/741 |
| 2011/0246735 | A1 | 10/2011 | Bryant et al. |
| 2011/0258290 | A1 | 10/2011 | Nightingale et al. |
| 2011/0258297 | A1 | 10/2011 | Nightingale et al. |
| 2011/0258482 | A1 | 10/2011 | Nightingale et al. |
| 2011/0258488 | A1 | 10/2011 | Nightingale et al. |
| 2011/0296025 | A1 | 12/2011 | Lieblich et al. |
| 2011/0307886 | A1* | 12/2011 | Thanga et al. ..................... 718/1 |
| 2012/0041976 | A1 | 2/2012 | Annapragada |
| 2012/0042162 | A1 | 2/2012 | Anglin et al. |
| 2012/0047239 | A1 | 2/2012 | Donahue et al. |
| 2012/0054556 | A1 | 3/2012 | Grube et al. |

OTHER PUBLICATIONS

Bafna et al, "CHIRAYU: A Highly Available Metadata Server for Object Based Storage Cluster File System," retrieved from <<http://abhinaykampasi.tripod.com/TechDocs/ChirayuPaper.pdf>>, IEEE Bombay Section, Year 2003 Prof K Shankar Student Paper & Project Contest, Apr. 2003, 6 pgs.

Buddhikot et al, "Design of a Large Scale Multimedia Storage Server," Journal Computer Networks and ISDN Systems, vol. 27, Issue 3, Dec. 1994, pp. 1-18.

Chen et al, "Replication-Based Highly Available Metadata Management for Cluster File Systems," 2010 IEEE International Conference on Cluster Computing, Sep. 2010, pp. 292-301.

Fan et al, "A Failure Recovery Mechanism for Distributed Metadata Servers in DCFS2," Seventh International Conference on High Performance Computing and Grid in Asia Pacific Region, Jul. 20-22, 2004, 7 pgs.

Fu, et al., "A Novel Dynamic Metadata Management Scheme for Large Distributed Storage Systems", Proceedings of the 2008 10th IEEE International Conference on High Performance Computing and Communications, Sep. 2008, pp. 987-992.

Fullmer et al, "Solutions to Hidden Terminal Problems in Wireless Networks," Proceedings of the ACM SIGCOMM '97 Conference on Applications, Technologies, Architectures, and Protocols for Computer Communication, Cannes, France, Oct. 1997, pp. 39-49.

Lang, "Parallel Virtual File System, Version 2", retrieved on Nov. 12, 2010 from <<http://www.pvfs.org/cvs/pvfs-2-7-branch.build/doc/pvfs2-guide/pvfs2-guide.php>>, Sep. 2003, 39 pages.

Sinnamohideen et al, "A Transparently-Scalable Metadata Service for the Ursa Minor Storage System," USENIX ATC'10 Proceedings of the 2010 USENIX Conference, Jun. 2010, 14 pgs.

Weil et al, "CRUSH: Controlled, Scalable, Decentralized Placement of Replicated Data," Proceedings of SC '06, Nov. 2006, 12 pgs.

Weiser, "Some Computer Science Issues in Ubiquitous Computing," retrieved at <<https://www.cs.ucsb.edu/~ravenben/papers/coreos/Wei93.pdf>>, Mar. 1993, 14 pgs.

U.S. Appl. No. 12/410,697, "Data Center Without Structural Bottlenecks," Maltz et al, filed Mar. 25, 2009.

U.S. Appl. No. 12/410,745, "Data Center Interconnect and Traffic Engineering," Maltz et al, filed Mar. 25, 2009.

U.S. Appl. No. 12/578,608, "Agile Data Center Network Architecture," Greenberg et al, filed Oct. 14, 2009.

"Citrix Storage Delivery Services Adapter for NetApp Data ONTAP", retrieved on Mar. 9, 2010 at <<http://citrix.com/site/resources/dynamic/partnerDocs/datasheet_adapter.pdf>>, Citrix Systems, Citrix Storage Delivery Services Data sheet, 2008, 2 pgs.

"EMC RecoverPoint Family: Cost-effective local and remote data protection and disaster recovery solution", retrieved on Mar. 9, 2010 at <<http://www.emc.com/collateral/software/data-sheet/h2769-emc-recoverpoint-family.pdf>>, EMC Corporation, Data Sheet H2769.8, 2010, 3 pgs.

Mohamed et al, "Extensible Communication Architecture for Grid Nodes," abstract retrieved on Apr. 23, 2010 at <<http://www.computer.org/portal/web/csdl/doi/10.1109/itcc.2004.1286587>>, International Conference on Information Technology: Coding and Computing (ITCC'04), vol. 2, Apr. 5-7, 2004, Las Vegas, NV, 1 pg.

Office Action for U.S. Appl. No. 13/412,944, mailed on Oct. 11, 2012, Nightingale et al., "Reading and Writing During Cluster Growth Phase", 10 pages.

Office Action for U.S. Appl. No. 12/763,107, mailed on Jul. 20, 2012, Nightingale et al., "Locator Table and Client Library for Datacenters", 11 pages.

PCT Search Report and Written Opinion mailed Oct. 23, 2012 for PCT Application No. PCT/US2012/035700, 10 pages.

Isard, et al., "Dryad: Distributed Data-Parallel Programs from Sequential Building Blocks", In Proceedings of the 2nd ACM SIGOPS/EuroSys European Conference on Computer Systems, Mar. 21, 2007, 14 pages.

Kennedy, "Is Parallel Computing Dead", retrieved on Oct. 2, 2012, at http://www.crpc.rice.edu/newsletters/oct94/director.html., Parallel Computing Newsletter, vol. 2, Issue 4, Oct. 1994, 2 pages.

Office Action for U.S. Appl. No. 13/017,193, mailed on Dec. 3, 2012, Nightingale et al., "Parallel Serialization of Request Processing", 19 pages.

Office Action for U.S. Appl. No. 13/112,978, mailed on Dec. 14, 2012, Elson et al., "Data Layout for Recovery and Durability", 13 pages.

Office Action for U.S. Appl. No. 13/116,270, mailed on Feb. 15, 2013, Nightingale et al., "Server Failure Recovery", 16 pages.

Rhea et al., "Maintenance-Free Global Data Storage", IEEE Internet Computing, Sep.-Oct. 2001, pp. 40-49.

* cited by examiner

BANDWIDTH-PROPORTIONED DATACENTERS

RELATED APPLICATIONS

This U.S. patent application is a continuation-in-part patent application of co-pending prior application Ser. No. 12/763,107, entitled "Locator Table and Client Library for Datacenters," and of co-pending prior application Ser. No. 12/763,133, entitled "Memory Management and Recovery for Datacenters." Both co-pending prior applications were filed on Apr. 19, 2010. U.S. application Ser. Nos. 12/763,107 and 12/763,133 are hereby incorporated by reference in their entirety herein.

BACKGROUND

Large-scale network-based services often require large-scale data storage. For example, Internet email services store large quantities of user inboxes, each user inbox itself including a sizable quantity of data. This large-scale data storage is often implemented in datacenters comprised of storage and computation devices. The storage devices are typically arranged in a cluster and include redundant copies. This redundancy is often achieved through use of a redundant array of inexpensive disks (RAID) configuration and helps minimize the risk of data loss. The computation devices are likewise typically arranged in a cluster.

Both sets of clusters often suffer a number of bandwidth bottlenecks that reduce datacenter efficiency. For instance, a number of storage devices or computation devices can be linked to a single network switch. Network switches are traditionally arranged in a hierarchy, with so-called "core switches" at the top, fed by "top of rack" switches, which are in turn attached to individual computation devices. The "Top of rack" switches are typically provisioned with far more collective bandwidth to the devices below them in the hierarchy than to the core switches above them. This causes congestion and inefficient datacenter performance. The same is true within a storage device or computation device: a storage device is provisioned with disks having a collective bandwidth that is greater than a collective bandwidth of the network interface component(s) connecting them to the network. Likewise, computations devices are provisioned with an input/output bus having a bandwidth that is greater than the collective network interface bandwidth. In both cases, the scarcity of network bandwidth causes congestion and inefficiency.

To resolve these inefficiencies and bottlenecks, many datacenter applications are implemented according to the "Map-Reduce" model. In the Map-Reduce model, computation and storage devices are integrated such that the program reading and writing data is located on the same device as the data storage. The MapReduce model introduces new problems for programmers and operators, constraining how data is placed, stored, and moved to achieve adequate efficiency over the bandwidth-congested components. Often, this may require fragmenting a program into a series of smaller routines to run on separate systems.

SUMMARY

Systems described herein include storage and computation nodes with bandwidth proportioned according to the capabilities of each node. Each node is provisioned with one or more network interface components having a collective bandwidth proportioned to a bandwidth of node components, such as storage unit bandwidth or input/output bus bandwidth. By provisioning network interface components based on a proportioning of bandwidth, each node is enabled to communicate to and from other nodes at the bandwidth of node components. For example, a computation node is provisioned with network interface components with a bandwidth sufficient enough to allow the computation node to communicate at the bandwidth of its input/output bus. Likewise, a storage node is provisioned with network interface components with a bandwidth sufficient enough to allow the storage node to communicate at the bandwidth of its storage units. In one implementation, the collective bandwidth of node components is matched to or within a predefined tolerance of the collective bandwidth of network interface components of the node. By proportioning bandwidth in this manner, the computation nodes of the system are able to access data stored on the storage nodes with performance substantially equivalent (i.e., matching or within a predefined tolerance) to accesses of data stored in local storage of the computation nodes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1A:
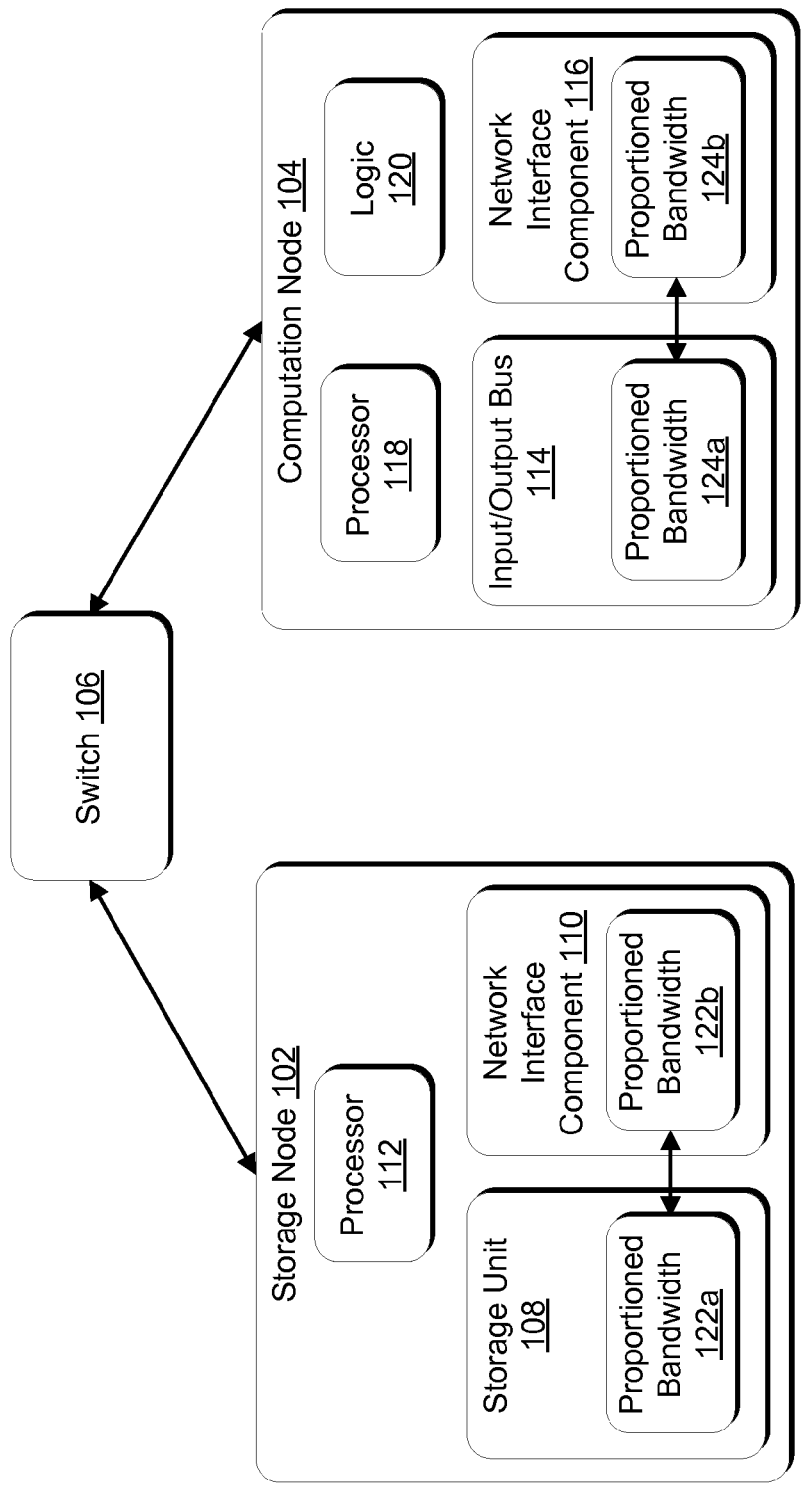
FIGS. 1a-1d illustrate block diagrams showing example configurations of storage and computation nodes, in accordance with various embodiments.

Described herein are storage nodes and computation nodes, as well as systems including at least one of each. Such systems can be used in datacenters for applications with large data storage requirements and/or bandwidth requirements for input/output operations. For example, the system described herein could be an Internet email service. The storage nodes store inboxes and other data associated with user email accounts, and the computation nodes read to and write from the stored inboxes. To avoid bottlenecks when transmitting requests and data between the nodes, each storage and computation node is provisioned with one or more network interface components having a collective bandwidth that is proportioned to bandwidth of other node components. As used herein, "proportioned" means that the bandwidths match or are within a predefined tolerance of one another (e.g., within ninety-five percent, ninety percent, eighty percent, seventy percent, etc.). Thus, in each storage node, the collective bandwidth of network interface components and the collective bandwidth of one or more storage units of the storage node are proportioned to one another. And in each computation node, the collective bandwidths of the network interface components and the bandwidth of the input/output (I/O) bus of the computation node are proportioned to one another.

By proportioning network interface component bandwidth to node component bandwidth, the system ensures that network interface component bandwidth does not cause any transmission delays and that data and requests are communicated to and from the nodes at the full bandwidth of the other node components. Returning to the example email service, this means that inboxes and other data stored in storage units of storage nodes can be written to and read from at the full bandwidth of the storage units. The result is an email service distributed among many devices with storage and computation remote from one another that performs as well as if each computation node were only needed to perform read and write operations to its own local storage.

Example Node Configurations

FIGS. 1a-1d illustrate block diagrams showing example configurations of nodes, in accordance with various embodiments. As illustrated, a storage node 102 and a computation node 104 are connected to one another via a switch 106. While only one storage node 102, one computation node 104, and one switch 106 are shown in FIGS. 1a-1d, any number of storage nodes 102 can be connected to any number of computation nodes 104 by any number of switches 106.

Each storage node 102 includes one or more storage units 108 and one or more network interface components 110, as well as a processor 112 for processing read and write requests for the storage units 108 that are received via the network interface components 110. Each computation node includes an I/O bus 114 and one or more network interface components 116, as well as a processor 118 and logic 120. The logic 120 sends read and write requests for the storage node 102 via the processor 118 and I/O bus 114 to the network interface components 116 for transmission to the storage node 102.

The bandwidth of the storage units 108 and network interface components 110 are proportioned to one another, and the bandwidth of the I/O bus 114 and network interface components 116 are proportioned to one another. FIG. 1a shows a storage node 102 with one storage unit 108 having a proportioned bandwidth 122a and one network interface component 110 having a proportioned bandwidth 122b, the proportioned bandwidths 122a and 122b being proportioned to one another. FIG. 1a also shows a computation node 104 with an I/O bus 114 having a proportioned bandwidth 124a and one network interface component 116 having a proportioned bandwidth 124b, the proportioned bandwidths 124a and 124b being proportioned to one another.

Figure 1B:
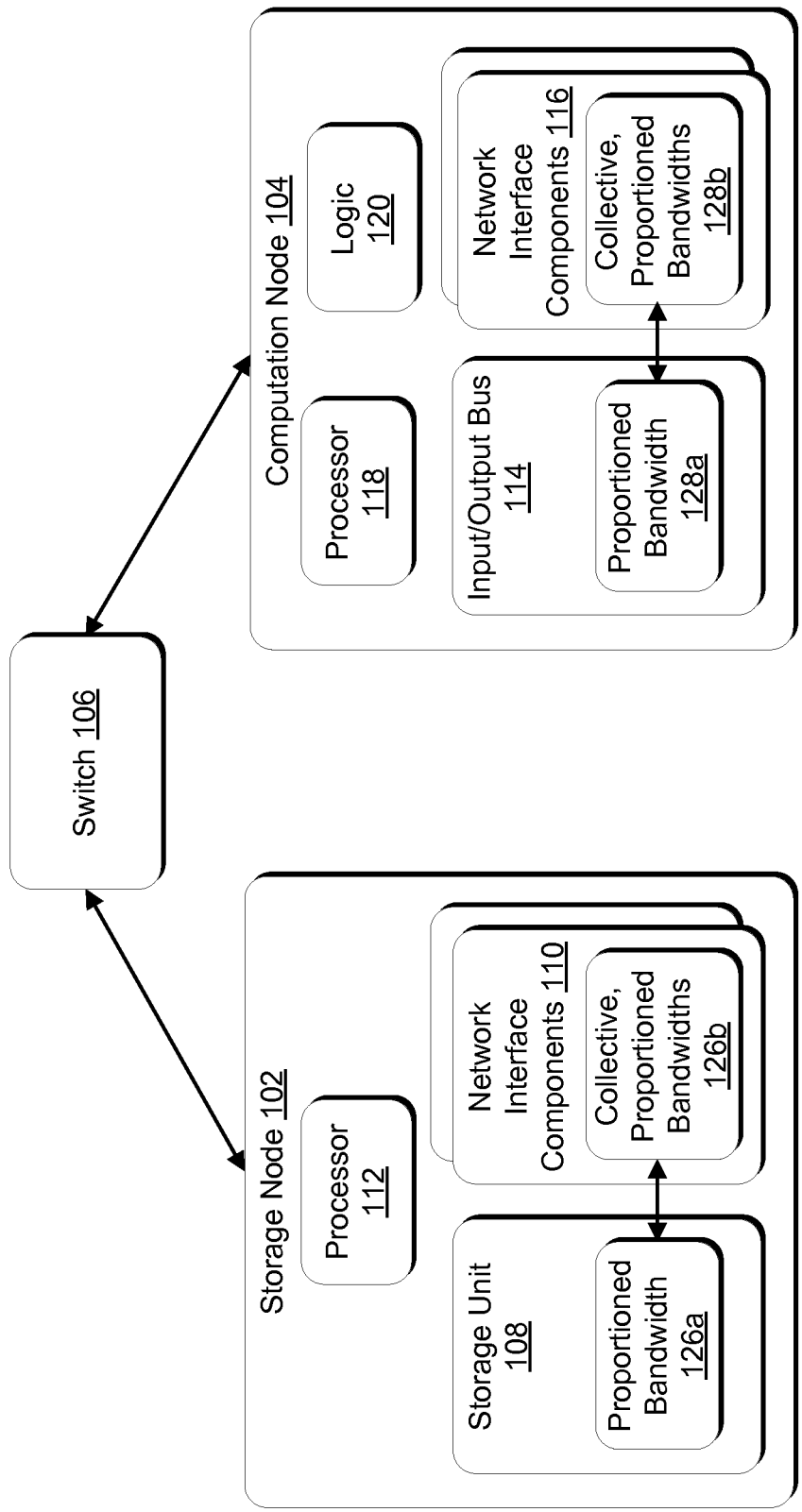

FIG. 1b shows a storage node 102 with one storage unit 108 having a proportioned bandwidth 126a and multiple network interface components 110 having a collective proportioned bandwidth 126b, the proportioned bandwidths 126a and 126b being proportioned to one another. FIG. 1b also shows a computation node 104 with an I/O bus 114 having a proportioned bandwidth 128a and multiple network interface components 116 having a collective proportioned bandwidth 128b, the proportioned bandwidths 128a and 128b being proportioned to one another.

Figure 1C:
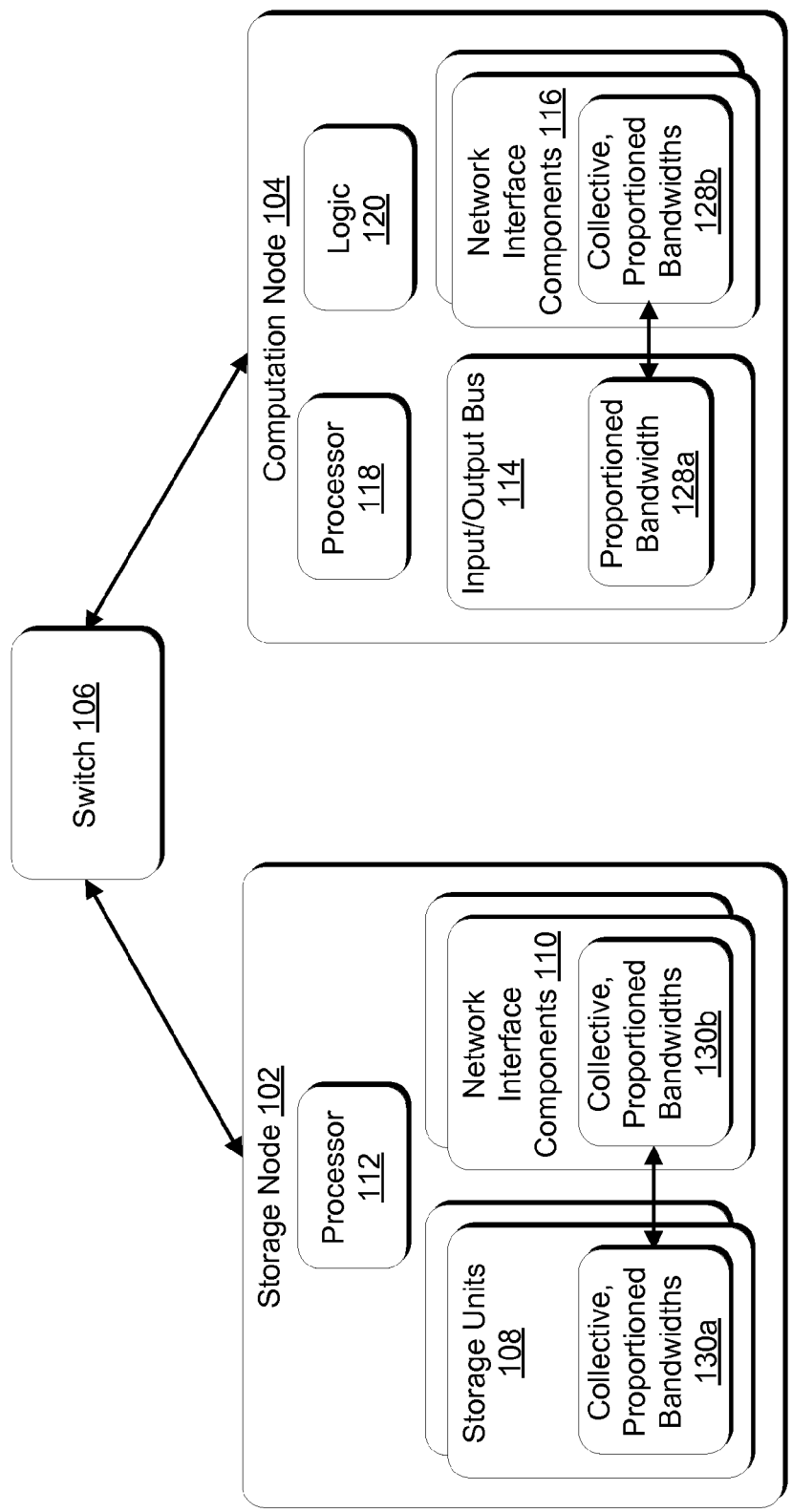

FIG. 1c shows a storage node 102 with multiple storage units 108 having a collective proportioned bandwidth 130a and multiple network interface components 110 having a collective proportioned bandwidth 130b, the proportioned bandwidths 130a and 130b being proportioned to one another. FIG. 1c also shows a computation node 104 with the same configuration shown in FIG. 1b.

Figure 1D:
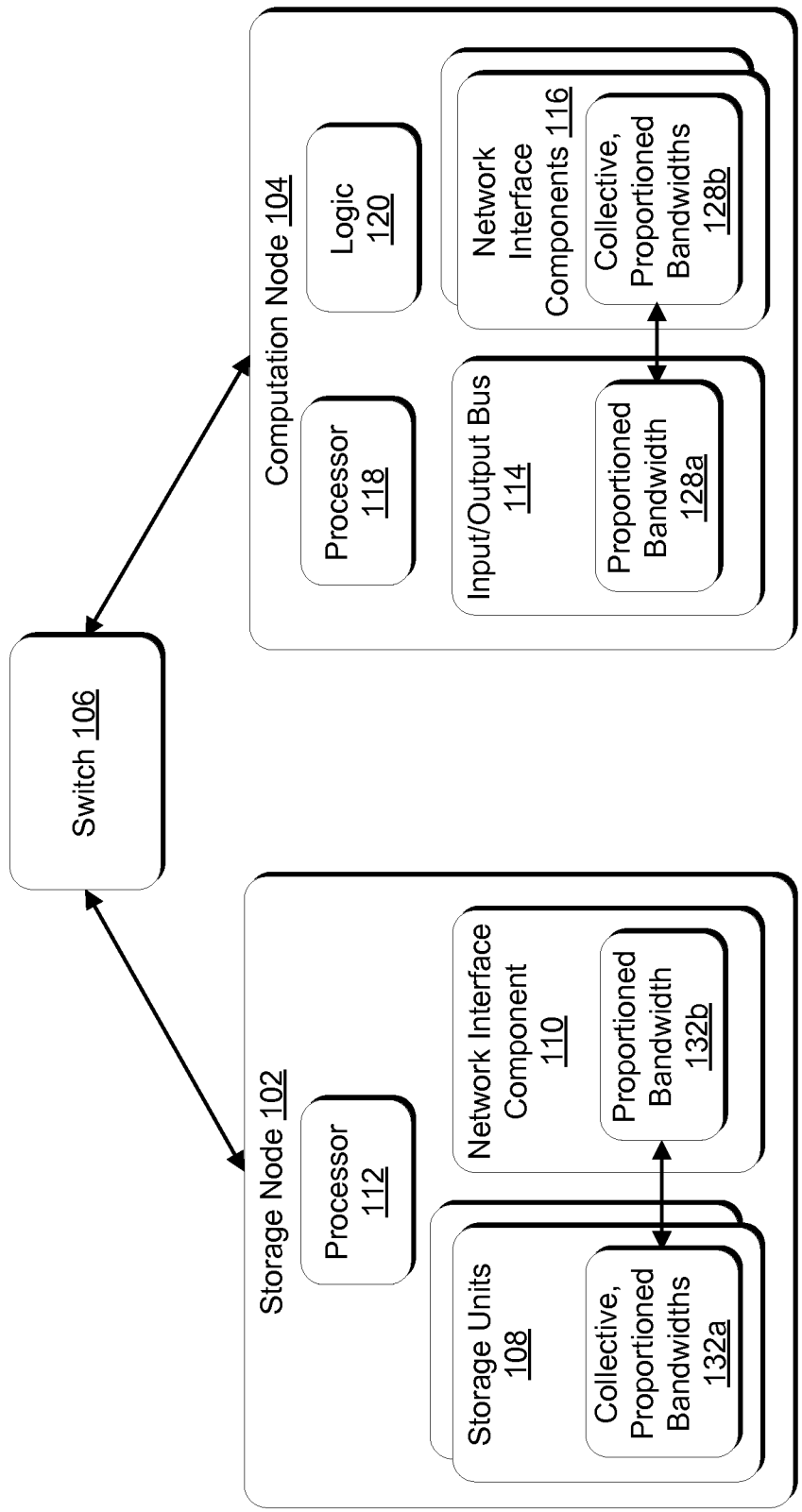

FIG. 1d shows a storage node 102 with multiple storage units 108 having a collective proportioned bandwidth 132a and one network interface component 110 having a proportioned bandwidth 132b, the proportioned bandwidths 132a and 132b being proportioned to one another. FIG. 1d also shows a computation node 104 with the same configuration shown in FIG. 1b. The configurations and pairings of nodes 102 and 104 shown in FIGS. 1a-1d are just a subset of the possible configurations and pairings of nodes 102 and 104 and are provided for the purpose of illustration.

In various embodiments, the storage node 102 is any computing device, such as a personal computer (PC), a laptop computer, a workstation, a server system, a mainframe, or any other computing device. In one embodiment, the storage node 102 is a virtual machine located on a computing device with other nodes or systems. The storage node 102 is a special purpose machine configured to store data and to receive and process requests for the data. To achieve the special purpose, the storage node 102 may be configured with relatively few components, such as the storage units 108, network interface components 110, and processor 112. In some embodiments, however, the storage node 102 may also include additional components, such as the additional components illustrated in FIG. 4 and described in greater detail below with reference to that figure.

Figure 3:
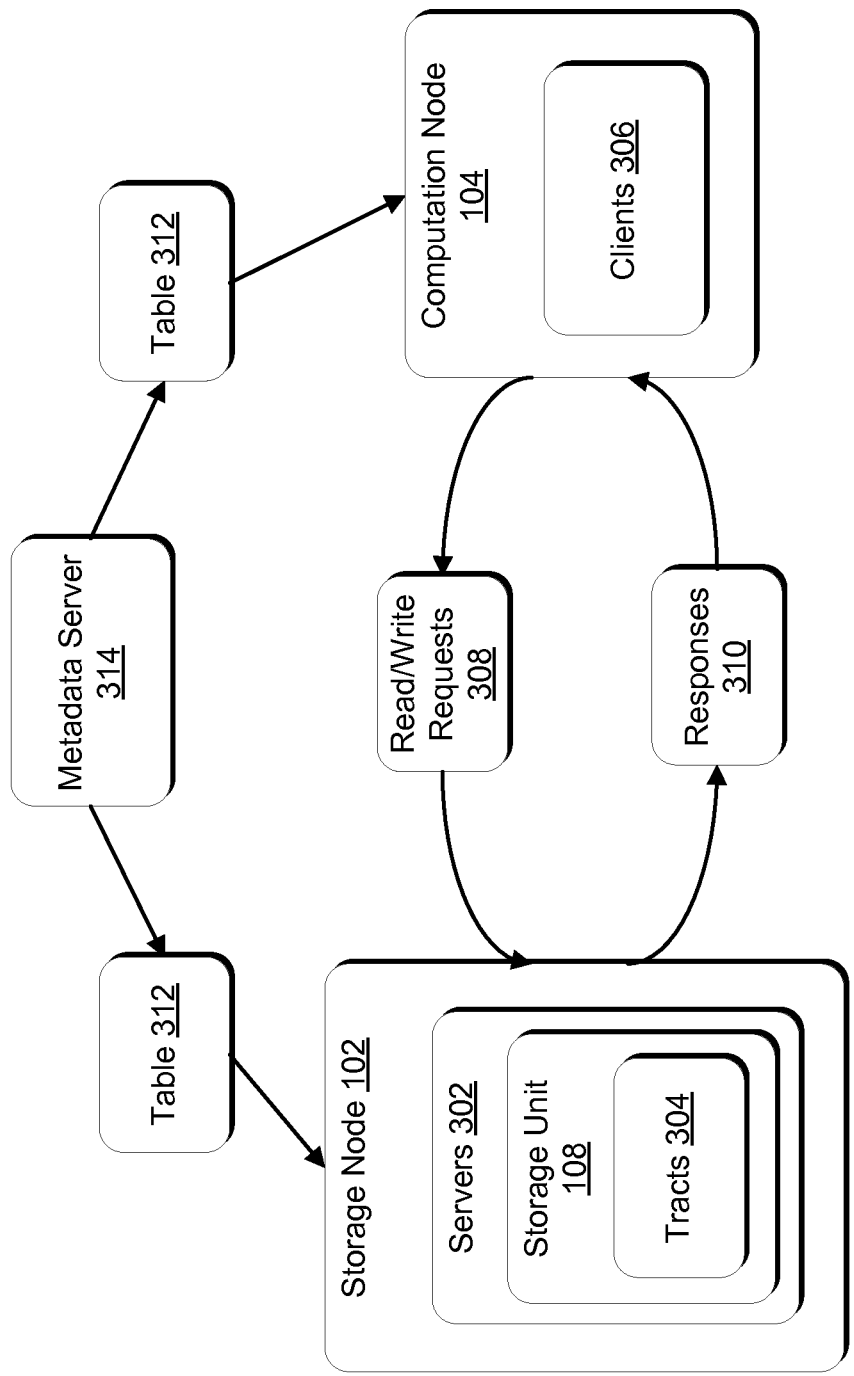
FIG. 3 illustrates a block diagram of an example software architecture for storage and computation nodes, in accordance with various embodiments.

The storage units 108 are any storage components and may include at least one of a disk drive, a permanent storage drive, random access memory, an electrically erasable programmable read-only memory, a Flash Memory, a miniature hard drive, a memory card, a compact disc (CD), a digital versatile disk (DVD) an optical storage drive, a magnetic cassette, a magnetic tape, or a magnetic disk storage. The memory of each storage unit 108 may store "tracts" of data, which have a predetermined same size, such as one megabyte, and represent the smallest unit of data that can be read from or written to a storage unit without giving up performance due to the lost opportunity of reading more data "for free" after a seek. The memory of each storage unit 108 may also include a table storing identifiers of the tracts stored on that storage unit 108 and locations where the tracts are stored. The storage and use of tracts is illustrated in FIG. 3 and described in greater detail below in reference to that figure.

In various embodiments, the network interface components 110 are any sort of network interface components and may include at least one of a network interface card, a device for communicating information to another computer, a modem, or an optical interface. Each network interface component 110 is capable of enabling a connection with a switch 106 to transmit data to and from the storage node 102.

As illustrated in FIGS. 1a-1d, the number of storage units 108 and the number of network interface components 110 may each vary based on a bandwidth associated with each component. In FIG. 1a, the storage node 102 includes one storage unit 108 with a proportioned bandwidth 122a and one network interface component 110 with a proportioned bandwidth 122b. The proportioned bandwidths 122a and 122b match or are within a predefined tolerance of one another. For example, the proportioned bandwidth 122a of the storage unit 108 could be nine-tenths of a gigabit per second and the proportioned bandwidth 122b of the network interface component 110 could be one gigabit per second. In proportioning the bandwidths 122a and 122b to one another, the storage node 102 can be provisioned with a network interface component 110 of a given bandwidth 122b based on the bandwidth 122a of the storage unit 108. In the alternative, the storage node 102 can be provisioned with a storage unit 108 of a given bandwidth 122*a* based on the bandwidth 122*b* of the network interface component 110.

In FIG. 1*b*, the storage node 102 includes one storage unit 108 with a proportioned bandwidth 126*a* and multiple network interface components 110 with a collective proportioned bandwidth 126*b*. The proportioned bandwidths 126*a* and 126*b* match or are within a predefined tolerance of one another. For example, the proportioned bandwidth 126*a* of the storage unit 108 could be ten gigabits per second and the collective proportioned bandwidth 126*b* of the network interface components 110 could also be ten gigabits per second, comprised of ten network interface components 110 each having a bandwidth of one gigabit per second. In proportioning the bandwidths 126*a* and 126*b* to one another, the storage node 102 can be provisioned with a number of network interface components 110 of a given bandwidth that collectively present the collective bandwidth 126*b* based on the bandwidth 126*a* of the storage unit 108. In the alternative, the storage node 102 can be provisioned with a storage unit 108 of a given bandwidth 126*a* based on the collective bandwidth 126*b* of the multiple network interface components 110.

In FIG. 1*c*, the storage node 102 includes multiple storage units 108 with a collective proportioned bandwidth 130*a* and multiple network interface components 110 with a collective proportioned bandwidth 130*b*. The collective proportioned bandwidths 130*a* and 130*b* match or are within a predefined tolerance of one another. For example, the proportioned bandwidth 130*a* of the multiple storage units 108 could be twelve gigabits per second, comprised of three storage units 108 each having a bandwidth of four gigabits per second, and the collective proportioned bandwidth 130*b* of the network interface components 110 could also be twelve gigabits per second, comprised of twelve network interface components 110 each having a bandwidth of one gigabit per second. In proportioning the collective bandwidths 130*a* and 130*b* to one another, the storage node 102 can be provisioned with a number of network interface components 110 of a given bandwidth that collectively present the collective bandwidth 130*b* based on the collective bandwidth 130*a* of the storage units 108. In the alternative, the storage node 102 can be provisioned with a number of storage units 108 of a given bandwidth that collectively present the collective bandwidth 130*a* based on the collective bandwidth 130*b* of the multiple network interface components 110.

In FIG. 1*d*, the storage node 102 includes multiple storage units 108 with a collective proportioned bandwidth 132*a* and one network interface component 110 with a proportioned bandwidth 132*b*. The collective proportioned bandwidths 132*a* and 132*b* match or are within a predefined tolerance of one another. For example, the proportioned bandwidth 132*a* of the multiple storage units 108 could be eight gigabits per second, comprised of two storage units 108 each having a bandwidth of four gigabits per second, and the proportioned bandwidth 132*b* of the network interface component 110 could also be eight gigabits per second. In proportioning the bandwidths 132*a* and 132*b* to one another, the storage node 102 can be provisioned with a network interface component 110 of a given bandwidth 132*b* based on the collective bandwidth 132*a* of the storage units 108. In the alternative, the storage node 102 can be provisioned with a number of storage units 108 of a given bandwidth that collectively present the collective bandwidth 132*a* based on the bandwidth 132*b* of the network interface component 110.

In various embodiments, as mentioned above, the storage node 102 includes a processor 112 in addition to the storage units 108 and network interface components 110. The processor 112 may be any sort of processor, such as one of the processors manufactured by Intel®, Applied Micro Devices (AMD®), or Motorola®. The processor 112 also includes memory, such as cache memory, utilized in processing the requests and responses of the storage node 102. Because the requests and responses are often small in size relative to the speed and capabilities of the processor 112, they do not pose the sort of bottleneck that bandwidth often does.

In addition, storage node 102 may comprise some sort of logic or embedded circuit for handling received requests and providing responses. Such logic could include memory management processes, threads, or routines executed by the processor 112.

In various embodiments, the computation node 104 shown in FIGS. 1*a*-1*d* is any computing device, such as a personal computer (PC), a laptop computer, a workstation, a server system, a mainframe, or any other computing device. In one embodiment, the computation node 104 is a virtual machine located on a computing device with other nodes or systems. Also, in an additional embodiment, the storage node 102 and computation node 104 may each be a virtual machine located on a shared computing device. The computation node 104 is a special purpose machine configured to form and send requests for the data stored on the storage node 102 and to process responses received from the storage node 102. To achieve the special purpose, the computation node 104 may be configured with relatively few components, such as the I/O bus 114, network interface components 116, processor 118, and logic 120. In some embodiments, however, the computation node 104 may also include additional components, such as the additional components illustrated in FIG. 4 and described in greater detail below with reference to that figure.

The I/O bus 114 is any sort of I/O bus connecting components of the computation node 104 such as the network interface components 116, the processor 118, and memory, such as system memory or permanent storage storing the logic 120. The I/O bus 114 has a transmission bandwidth, shown as proportioned bandwidth 124*a* in FIG. 1*a* and as proportioned bandwidth 128*a* in FIGS. 1*b*-1*d*. For example, the I/O bus 114 could have a bandwidth of four gigabits per second.

In various embodiments, the network interface components 116 are any sort of network interface components and may include at least one of a network interface card, a modem, or an optical interface. Each network interface component 116 is capable of enabling a connection with a switch 106 to transmit requests and responses to and from the computation node 104.

As illustrated in FIGS. 1*a*-1*d*, the number of network interface components 116 may vary based on a bandwidth associated with each network interface component 116 and based on the I/O bus bandwidth. In FIG. 1*a*, the computation node 104 includes an I/O bus 114 with a proportioned bandwidth 124*a* and one network interface component 116 with a proportioned bandwidth 124*b*. The proportioned bandwidths 124*a* and 124*b* match or are within a predefined tolerance of one another. For example, the proportioned bandwidth 124*a* of the I/O bus 114 could be four gigabits per second and the proportioned bandwidth 124*b* of the network interface component 116 could also be four gigabits per second. In proportioning the bandwidths 124*a* and 124*b* to one another, the computation node 104 can be provisioned with a network interface component 116 of a given bandwidth 124*b* based on the bandwidth 124*a* of the I/O bus 114.

In FIGS. 1*b*-1*d*, the computation node 104 includes an I/O bus 114 with a proportioned bandwidth 128*a* and multiple network interface components 116 with a collective proportioned bandwidth 128*b*. The proportioned bandwidths 128*a* and 128*b* match or are within a predefined tolerance of one another. For example, the proportioned bandwidth 128a of the I/O bus 114 could be four gigabits per second and the collective proportioned bandwidth 128b of the network interface components 116 could also be four gigabits per second, comprised of two network interface components 116 each having a bandwidth of two gigabits per second. In proportioning the bandwidths 128a and 128b to one another, the computation node 104 can be provisioned with a number of network interface components 116 of a given bandwidth that collectively present the collective bandwidth 128b based on the bandwidth 128a of the I/O bus 114.

In various embodiments, as mentioned above, the computation node 104 includes a processor 118 in addition to the I/O bus 114 and network interface components 116. The processor 118 may be any sort of processor, such as one of the processors manufactured by Intel®, Applied Micro Devices (AMD®), or Motorola®. The processor 118 also includes memory, such as cache memory, utilized in forming and sending the requests and in processing the responses received by the computation node 104. Because the requests and responses are often small in size relative to the speed and capabilities of the processor 118, they do not pose the sort of bottleneck that bandwidth often does.

Also, as shown in FIGS. 1a-1d, the computation node 104 includes logic 120. Such logic 120 could include applications, processes, threads, or routines executed by the processor 118. The logic 120 could be stored in system memory or permanent storage of the computation node 104 or implemented by a circuit, such as an application-specific integrated circuit, of the computation node 104. In some embodiments, the logic 120 is an application or part of an application associated with a datacenter that includes the storage node 102 and computation node 104. The logic 120 formulates read and write requests, as well as other requests and communications. The logic 120 then also receives and processes responses to the requests and communications.

In various embodiments, the storage node 102 and the computation node 104 are connected by one or more switches 106. The switches 106 may be any sort of switches. The switches 106 also each include network interface components, such as incoming and outgoing network interface components, each network interface component having a bandwidth. For example, a switch 106 may have a number of incoming Ethernet ports and an incoming wireless port, as well as outgoing Ethernet and wireless ports. In some embodiments, the incoming bandwidth of a switch 106 is proportioned to the outgoing bandwidth of the switch 106. For instance, the collective incoming bandwidth of the network interfaces that serve devices ("below" the switch in the network hierarchy) may be ten gigabits per second, and the collective bandwidth of the network interface components up to core switches may also be ten gigabits per second. By proportioning the incoming and outgoing bandwidths of the switch 106, the system avoids introduction of bottlenecks associated with the switch 106. Such switches with proportioned bandwidths are described in further detail in U.S. patent application Ser. No. 12/410,697, which is entitled "Data Center Without Structural Bottlenecks" and was filed on Mar. 25, 2009, in U.S. patent application Ser. No. 12/410,745, which is entitled "Data Center Interconnect and Traffic Engineering" and was filed on Mar. 25, 2009, and in U.S. patent application Ser. No. 12/578,608, which is entitled "Agile Data Center Network Architecture" and was filed on Oct. 14, 2009.

Figure 2A:
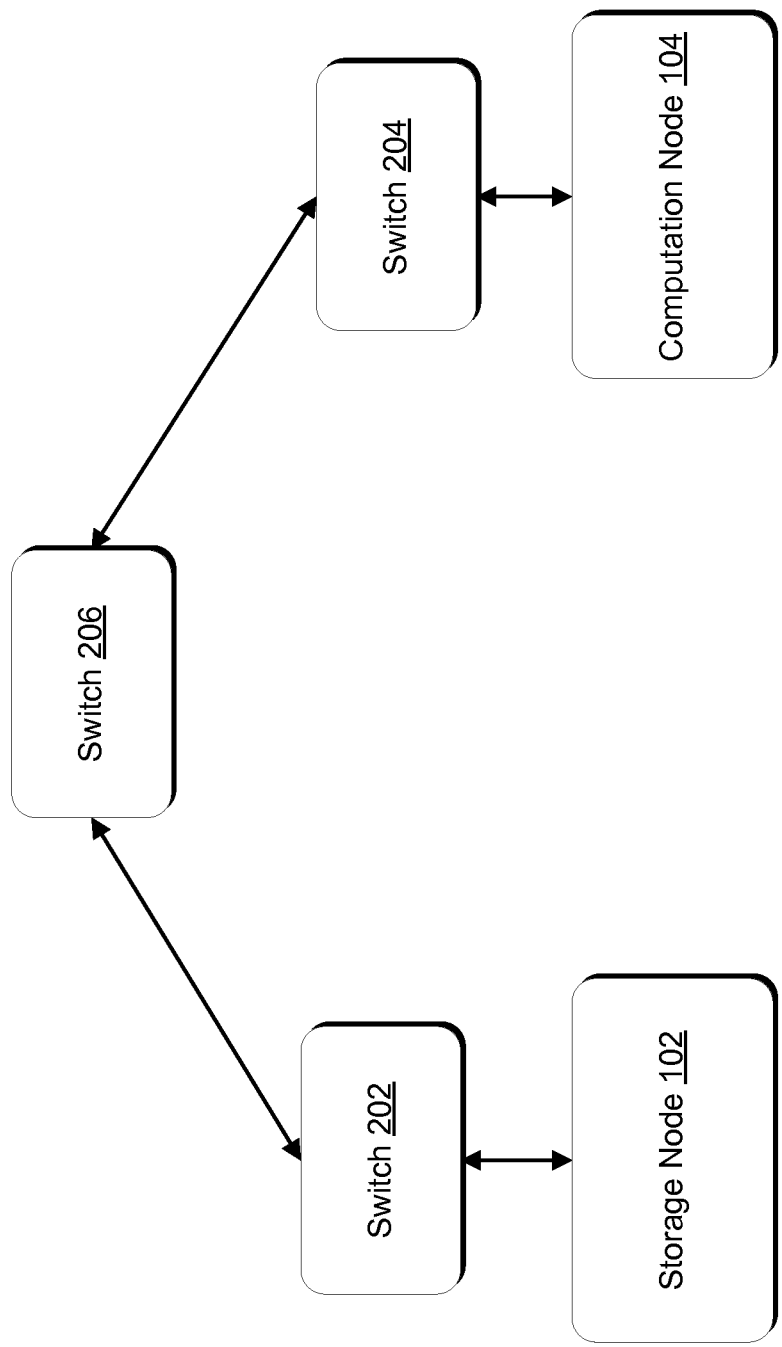
FIGS. 2a-2b illustrate block diagrams showing example system architectures, in accordance with various embodiments.
Figure 2B:
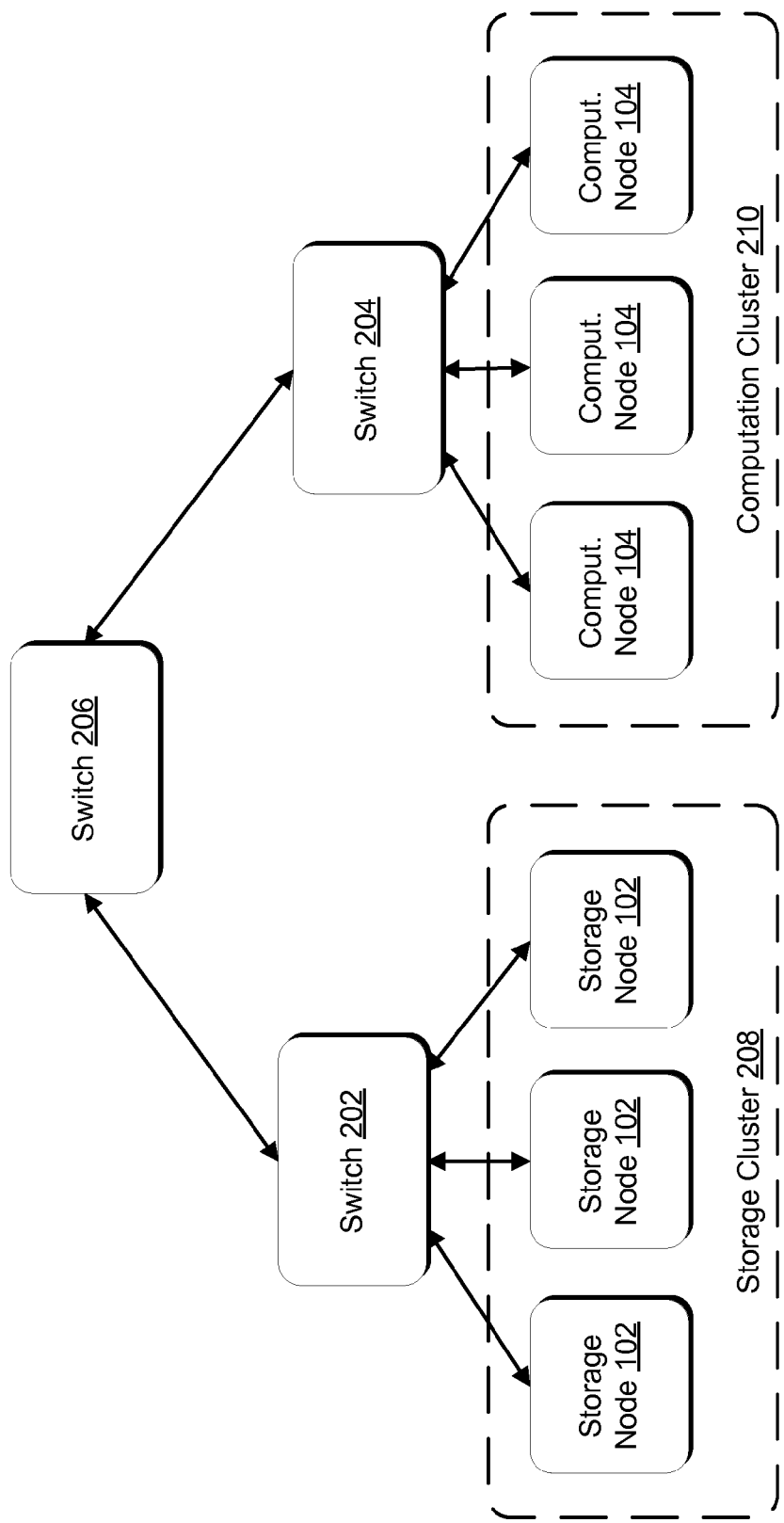

In some embodiments, the storage node 102 and computation node 104 may be connected by multiple switches 106, the multiple switches 106 connected to each other. Such embodiments are illustrated in FIGS. 2a-2b and are described further below with reference to those figures. The multiple switches 106 can also comprise a network, such as a wide area network (WAN), a local area network (LAN), or a personal area network (PAN). The network may also be a private network such as a network specific to a datacenter. In such an implementation, the switches 106 comprise or are connected to routers and/or devices acting as bridges between data networks. Communications between the storage node 102 and computation node 104 through the switches 106 and routers may utilize any sort of communication protocol known in the art for sending and receiving messages, such as the Transmission Control Protocol/Internet Protocol (TCP/IP) and/or the Uniform Datagram Protocol (UDP).

The result of provisioning storage nodes 102 and computation nodes 104 with proportioned bandwidth as shown in FIGS. 1a-1d is a system that enables computation node logic 120 to read and write data to the storage node 102 with performance substantially equivalent to reading and writing data to a local storage device of the computation node 104. It is a system that imposes no penalty for communication between nodes by eliminating bottlenecks associated with network bandwidth. In the storage node 102, the proportioning of network interface component bandwidth and storage unit bandwidth to one another enables communication to and from other nodes at the collective bandwidth of the storage units 108. In the computation node 104, the proportioning of network interface component bandwidth and I/O bus bandwidth to one another enables communication to and from other nodes at the bandwidth of the I/O bus 114.

In one embodiment, the storage node 102 and computation node 104 are each provisioned with network interface components 110/116 having greater collective bandwidth than the other node components. By provisioning greater network interface component bandwidth, the storage node 102 and computation node 104 are enabled to operate at the full bandwidths of the other node components and still offer additional network interface component bandwidth for use in sending and receiving data.

Example System Architectures

FIGS. 2a-2b illustrate block diagrams showing example system architectures, in accordance with various embodiments. As illustrated in FIG. 2a, the storage node 102 and computation node 104 are each connected to a separate switch 202/204, and those switches are in turn connected by a third switch 206. Each of switches 202-206 may be the same sort of switch as the switch 106 and may have the same characteristics and capabilities described above with regard to the switch 106. In some embodiments, additional switches besides switches 202-206 (not shown) are used to connect the storage node 102 and computation node 104. As discussed above, some of these switches 202-206 may be remote from each other, connected to routers, or comprise routers. In such embodiments, the switches 202-206 would comprise a network, such as the network discussed herein with regard to switch 106. Collectively, the switches 202-206, storage node 102, and computation node 104 may comprise a datacenter.

In FIG. 2b, the switch 202 is connected to a plurality of storage nodes 102, the plurality of storage nodes 102 comprising a storage cluster 208. Also, the switch 204 is connected to a plurality of computation nodes 104, the plurality of computation nodes comprising a computation cluster 210. By making use of clusters 208 and 210, storage and processing become distributed, allowing more efficient reading, writing, and computation. As noted above, the incoming bandwidth of a switch 106 may be proportioned to its outgoing bandwidth. The incoming and outgoing bandwidths of switches 202-206 may be proportioned in the same way.

Additionally, in some embodiments, the incoming bandwidth of a switch 202 or 204 is proportioned to the collective network interface bandwidth of the network interface components of the nodes 102/104 comprising the cluster 208/210, thus avoiding introduction of any bottlenecks. Collectively, the switches 202-206, storage cluster 208, and computation cluster 210 may comprise a datacenter.

Example Software Architecture

FIG. 3 illustrates a block diagram of an example software architecture for a storage node 102 and a computation node 104, in accordance with various embodiments. As illustrated, each storage node 102 includes one or more servers 302, such as a server 302 for each storage unit 108. The storage units 108 store "tracts" 304 of data, which have a predetermined same or similar size, such as one megabyte, and represent the smallest unit of data that can be read from or written to a storage unit that maximizes performance. For example, on a mechanical device, such as a disk, the "tract" size would be large enough to avoid t giving up performance due to the lost opportunity of reading more data "for free" after a seek or rotational delay. As a second example, on a medium such as flash, the "tract" size would be calculated based on the chip bandwidth and characteristics of the flash storage medium. Each tract 304 belongs to a byte sequence, each byte sequence being comprised of multiple tracts 304 distributed across multiple servers 302 to enable more efficient reading from and writing to the tracts 304. In one embodiment, the same tract 304 is stored on a plurality of servers 302 to ensure redundancy.

As is also shown, each computation node 104 includes a client 306, the clients 306 formulating and transmitting read and write requests 308 to the servers 302 and receiving and processing responses 310. In some embodiments, the write request 308 is one of an atomic append or a random write. The choice of whether to perform the write request 308 as an atomic append or a random write is determined by whether byte sequence being written to has been opened in an atomic append mode or a random write mode. The byte sequence may be opened by client 306 on its one or by a group of clients 306 in coordination with one another.

In some embodiments, the clients 306 identify which servers 302 to provide the requests 308 to based on a table 312. The table 312 may include mappings between tracts 304 or groups of tracts 304 and servers 302, and may ensure that the tracts comprising a byte sequence are uniformly distributed across a plurality of servers 302. The servers 302 may likewise utilize the table 312 to determine which tracts 304 that they should store.

In various embodiments, the table 312 is provided to the clients 306 and servers 302 by a metadata server 314. The metadata server 314 may be implemented on an independent node that is neither a storage node 102 nor a computation node 104, or may be implemented on one of the storage nodes 102 or the computation nodes 104. In some embodiments, the metadata server 314 generates the table 312 in response to the addition or failure of a storage unit 108.

In an example implementation, a client 306 receives a request associated with a byte sequence comprised of multiple tracts 304. The client 306 then utilizes the table 312 to identify the multiple servers 302 storing the multiple tracts 304 of the byte sequence. Next, the client 306 formulates and sends requests 308 to the servers 302. Because the bandwidth of the network interface components 116 of the computation node 104 including the client 306 has been proportioned to the bandwidth of the I/O bus 114, the requests 308 are transmitted without encountering any bottlenecks at the network interface components 116 of the computation node 104. The servers 302 then receive and process the requests 308 and formulate and send responses 310 to the requests 308. Because the bandwidth of the network interface components 110 of the storage nodes 102 including the servers 302 has been proportioned to the bandwidth of the storage units 108, the requests 308 and responses 310 are processed without any bottlenecks being introduced by the network interface components 110 of the storage nodes 102.

Example Computer System

Figure 4:
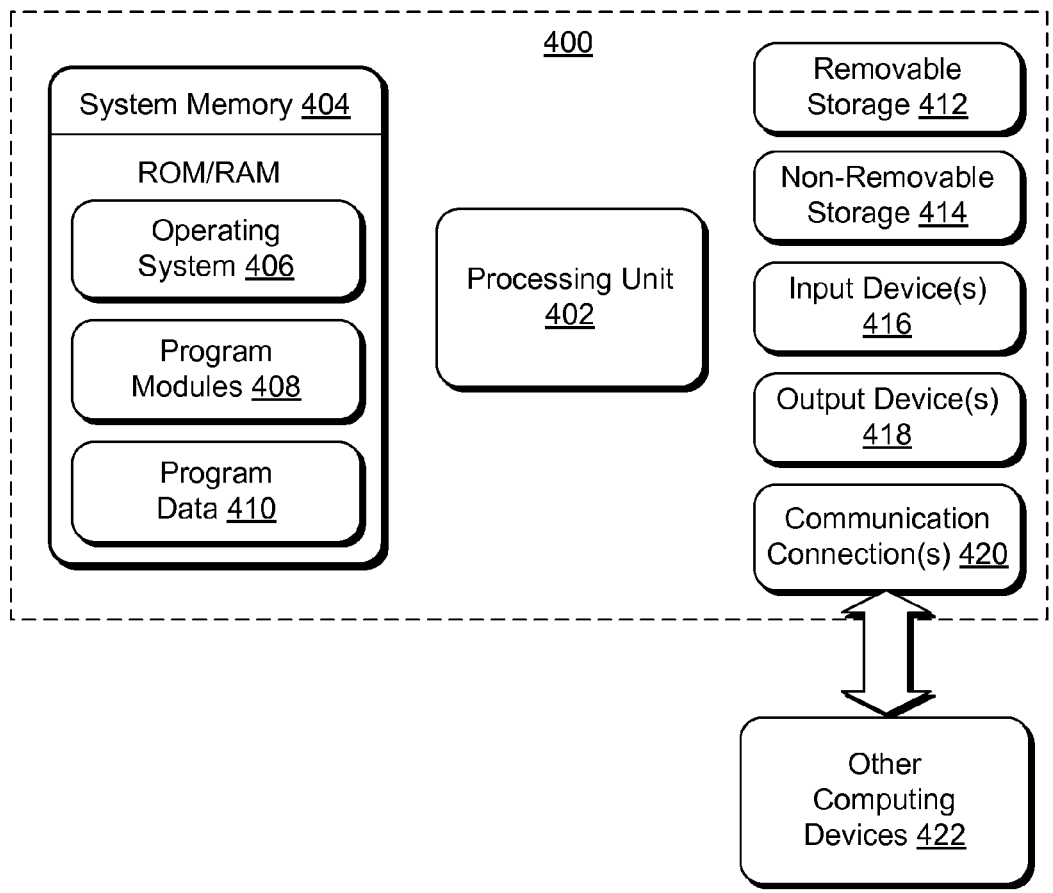
FIG. 4 illustrates a block diagram showing components of a computer system such as a storage node or a computation node, in accordance with various embodiments.

FIG. 4 illustrates a block diagram showing components of a computer system 400 such as a storage node 102 or a computation node 104, in accordance with various embodiments. In various embodiments, computer system 400 may include at least one processing unit 402 and system memory 404. The processing unit 402 may be any sort of processing unit and may represent the processor 112 or the processor 118. Depending on the exact configuration and type of computing device, system memory 404 may be volatile (such as RAM), non-volatile (such as ROM, flash memory, etc.) or some combination of the two. System memory 404 may include an operating system 406, one or more program modules 408, and may include program data 410.

Computer system 400 may also include additional data storage devices (removable and/or non-removable) such as, for example, magnetic disks, optical disks, or tape. Such additional storage is illustrated in FIG. 4 by removable storage 412 and non-removable storage 414. Removable storage 412 and non-removable storage 414 may represent the storage units 108 if the computer system 400 is a storage node 102. Computer-readable storage media may include volatile and nonvolatile, removable and non-removable media implemented in any method or technology for storage of information, such as computer readable instructions, data structures, program modules, or other data. System memory 404, removable storage 412 and non-removable storage 414 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computer system 400. Any such computer-readable storage media may be part of the computer system 400.

In various embodiment, any or all of system memory 404, removable storage 412, and non-removable storage 414, may store programming instructions which, when executed, implement some or all of the above-described operations of the storage node 102 or computation node 104. When the computer system 400 is a computation node 104, the programming instructions may include the logic 120.

Computer system 400 may also have input device(s) 416 such as a keyboard, a mouse, a touch-sensitive display, voice input device, etc. Output device(s) 418 such as a display, speakers, a printer, etc. may also be included. These devices are well known in the art and need not be discussed at length here.

Computer system 400 may also contain communication connections 420 that allow the device to communicate with other computing devices 422. The communication connections 420 are implemented at least partially by network interface components, such as the network interface components 110 and 116 shown in FIGS. 1a-1d and described further above.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A system comprising:
at least one storage node having one or more network interface components and one or more storage units configured to store data, the network interface components having a collective bandwidth that is proportionate to a collective bandwidth of the storage units, the storage node being configured to communicate to and from other nodes at the collective bandwidth of the storage units;
at least one computation node having a processor, logic configured to read or write data to the at least one storage node, and one or more network interface components, each network interface component having an associated bandwidth; and
one or more switches connecting the at least one storage node to the at least one computation node such that a collective bandwidth available between the at least one computation node and the at least one storage node is greater than or equal to a smaller of either the collective bandwidth of the storage units on the at least one storage node or a collective bandwidth of the network interface components of the at least one computation node.

2. The system of claim 1, wherein the at least one storage node comprises a cluster of storage nodes and the at least one computation node comprises a cluster of computation nodes.

3. The system of claim 2, wherein the system is a datacenter.

4. The system of claim 1, wherein the at least one storage node and the at least one computation node are remote from one another.

5. The system of claim 4, wherein the collective bandwidth of the at least one storage node and the collective bandwidth of the at least one computation node enable the logic to read and write data to the at least one storage node with performance substantially equivalent to reading and writing data to a local storage device of the at least one computation node.

6. The system of claim 1, wherein the network interface components of the at least one storage node or the network interface components of the at least one computation node include at least one of a network interface card, a modem, or an optical interface.

7. The system of claim 1, wherein:
the at least one storage node comprises a plurality of storage nodes, each storage node being a server,
the at least one computation node is a client, and
the system includes a metadata server that maps data to storage nodes to enable the client to retrieve the mapped data.

8. The system of claim 1, wherein the one or more switches comprise a plurality of connected switches each having an incoming transmission bandwidth and an outgoing transmission bandwidth that are proportionate to one another.

9. The system of claim 8, wherein the one or more switches comprise a network that provides sufficient bandwidth between the compute nodes and the storage nodes for each of the at least one compute nodes to simultaneously read a tract from at least one of the storage nodes.

10. A storage node comprising:
one or more network interface components, each network interface component having a bandwidth;
a processor coupled to the network interface components and configured to process requests received from remote computation nodes; and
one or more storage units coupled to the processor, the storage units having a collective bandwidth that is proportionate to the collective bandwidth of the network interface components,
wherein the storage node is configured to communicate to and from other nodes at the collective bandwidth of the storage units.

11. The storage node of claim 10, wherein the collective bandwidth of the storage units and the collective bandwidth of the network interface components are within a predefined tolerance of one another.

12. The storage node of claim 11, wherein the collective bandwidth of the storage units matches the collective bandwidth of the network interface components.

13. The storage node of claim 10, wherein the storage units store data in a plurality of tracts, each tract belonging to a byte sequence comprised of multiple tracts, the multiple tracts of the byte sequence being distributed across multiple storage units.

14. The storage node of claim 10, wherein the storage node comprises a greater number of network interface components than storage units or a greater number of storage units than network interface components.

15. The storage node of claim 10, wherein one of the storage units is selected from a disk drive, a permanent storage drive, random access memory, an electrically erasable programmable read-only memory, a Flash Memory, a miniature hard drive, a memory card, a compact disc (CD), a digital versatile disk (DVD) an optical storage drive, a magnetic cassette, a magnetic tape, or a magnetic disk storage.

16. A computation node comprising:
a processor;
logic configured to be executed by the processor to formulate requests for remote storage nodes;
an input/output bus coupled to the processor, the input/output bus having a bandwidth; and
one or more network interface components, the network interface components having a collective bandwidth that is proportionate to the bandwidth of the input/output bus,
wherein the computation node is configured to communicate to and from other nodes at the bandwidth of the input/output bus.

17. The computation node of claim 16, wherein the bandwidth of the input/output bus and the collective bandwidth of the network interface components are within a predefined tolerance of one another.

18. The computation node of claim 17, wherein the bandwidth of the input/output bus matches the collective bandwidth of the network interface components.

19. The computation node of claim 16, wherein the requests include read and write requests.

20. The computation node of claim 19, wherein the write request is one of an atomic append or a random write and choice of whether to perform the write request as an atomic append or a random write is determined by whether byte sequence being written to is opened in an atomic append mode or a random write mode.

* * * * *